(12) United States Patent
Bayer et al.

(10) Patent No.: US 6,382,738 B1
(45) Date of Patent: May 7, 2002

(54) PRESSURE SENSOR ASSEMBLY

(75) Inventors: Ronald Bayer, Mühlheim; Manfred Rüffer, Sulzbach; Ulrich Neumann, Robssorf; Andreas Klein, Bad Homburg; Johann Jungbecker, Badenheim; Christian Albrich Von Albrichsfeld, Darmstadt, all of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/647,205

(22) PCT Filed: Mar. 23, 1999

(86) PCT No.: PCT/EP99/01950

§ 371 Date: Apr. 17, 2001

§ 102(e) Date: Apr. 17, 2001

(87) PCT Pub. No.: WO99/50115

PCT Pub. Date: Oct. 7, 1999

(30) Foreign Application Priority Data

Mar. 31, 1998 (DE) .......................... 198 14 306
Mar. 31, 1998 (DE) .......................... 198 14 311
Sep. 10, 1998 (DE) .......................... 198 41 334

(51) Int. Cl.[7] ................................ B60T 8/36
(52) U.S. Cl. ................ 303/119.2; 303/DIG. 3
(58) Field of Search ................ 303/119.2, 119.3, 303/113.1, DIG. 3, DIG. 10

(56) References Cited

U.S. PATENT DOCUMENTS

| | | | |
|---|---|---|---|
| 4,442,716 A | | 4/1984 | Coe et al. |
| 4,513,623 A | | 4/1985 | Kurtz et al. |
| 5,449,227 A | * | 9/1995 | Steinberg et al. ........ 303/119.2 |
| 5,466,055 A | * | 11/1995 | Schmitt et al. .......... 303/119.2 |
| 5,482,362 A | * | 1/1996 | Robinson ................. 303/119.2 |
| 5,957,547 A | * | 9/1999 | Schliebe et al. ......... 303/119.3 |
| 6,007,162 A | * | 12/1999 | Hinz et al. ............... 303/119.3 |
| 6,126,244 A | * | 10/2000 | Fries ............................ 303/3 |
| 6,224,169 B1 | * | 5/2001 | Aoki et al. .............. 303/116.4 |

FOREIGN PATENT DOCUMENTS

| | | |
|---|---|---|
| DE | 41 33 879 | 4/1993 |
| DE | 44 32 165 | 3/1996 |
| DE | 195 14 383 | 10/1996 |
| DE | 297 14 229 | 11/1997 |
| WO | 97 00433 | 1/1997 |
| WO | WO 00/02755 | * 1/2000 |

* cited by examiner

*Primary Examiner*—Christopher P. Schwartz
*Assistant Examiner*—Melanie Torres
(74) *Attorney, Agent, or Firm*—Rader, Fishman & Grauer PLLC

(57) ABSTRACT

The present invention relates to a pressure sensor unit, in particular for a pressure control device, comprising a carrier housing for holding several pressure sensors, wherein the carrier housing accepts the pressure sensors as a modular assembly that can be preliminarily tested and forms an independent subassembly preferably arranged between a first and second housing of the pressure control device.

10 Claims, 3 Drawing Sheets

PRESSURE SENSOR ASSEMBLY

TECHNICAL FIELD

The present invention generally relates to pressure sensors and more particularly relates to a pressure sensor unit, in particular for a pressure control device for wheel-slip controlled brake systems of motor vehicles.

BACKGROUND OF THE INVENTION

DE 195 14 383 A1 already discloses this general type of pressure control unit for a wheel-slip controlled brake system of a motor vehicle, wherein such unit exhibited a first housing for holding several electrically actuatable pressure control valves and a second housing for holding electric and electronic components. When the second housing is placed on the first housing electric contact is made not only to the pressure control valves but also to the pressure sensors attached in the first block-shaped housing, whose electric or electronic components are integrated in the individual sensor housings.

This results in a detached form of construction where every single pressure sensor has to be inserted individually and separate electric contact has to be made to the corresponding components in the pressure control device, a manner of proceeding that involves considerable testing and assembly work.

WO-A-97/00433 discloses a pressure gauge with a sensor plate which includes several measuring diaphragms for measuring different pressures. The measuring diaphragms are distributed evenly over the sensor plate in the manner of a matrix.

U.S. Pat. No. 4,442,716 discloses a pressure gauge module which includes a pressure connector assembly and a heating plate disposed therebeneath and resting on a seal. The pressure connector assembly is placed on a pressure transducer frame, and the heating plate and the seal are arranged within the pressure transducer frame. The pressure transducer frame encloses the pressure transducers provided with plug contacts and accommodated in electric sockets on the top side of a printed circuit. The pressure connector assembly is attached to the pressure transducer frame by screws.

German utility model DE-U-297 14 229 describes a bottom plate for a gear unit control which is inserted into a housing that accommodates a printed circuit board with electric and electronic components for controlling electro-hydraulic actuators and pressure sensors connected to electrical contacts of the printed circuit board.

The object of the present invention is to provide a pressure sensor unit that simplifies the production of a certain arrangement of pressure sensors in a pressure control device.

DETAILED DESCRIPTION OF THE PREFERRED EMBODIMENTS

Figure 1:
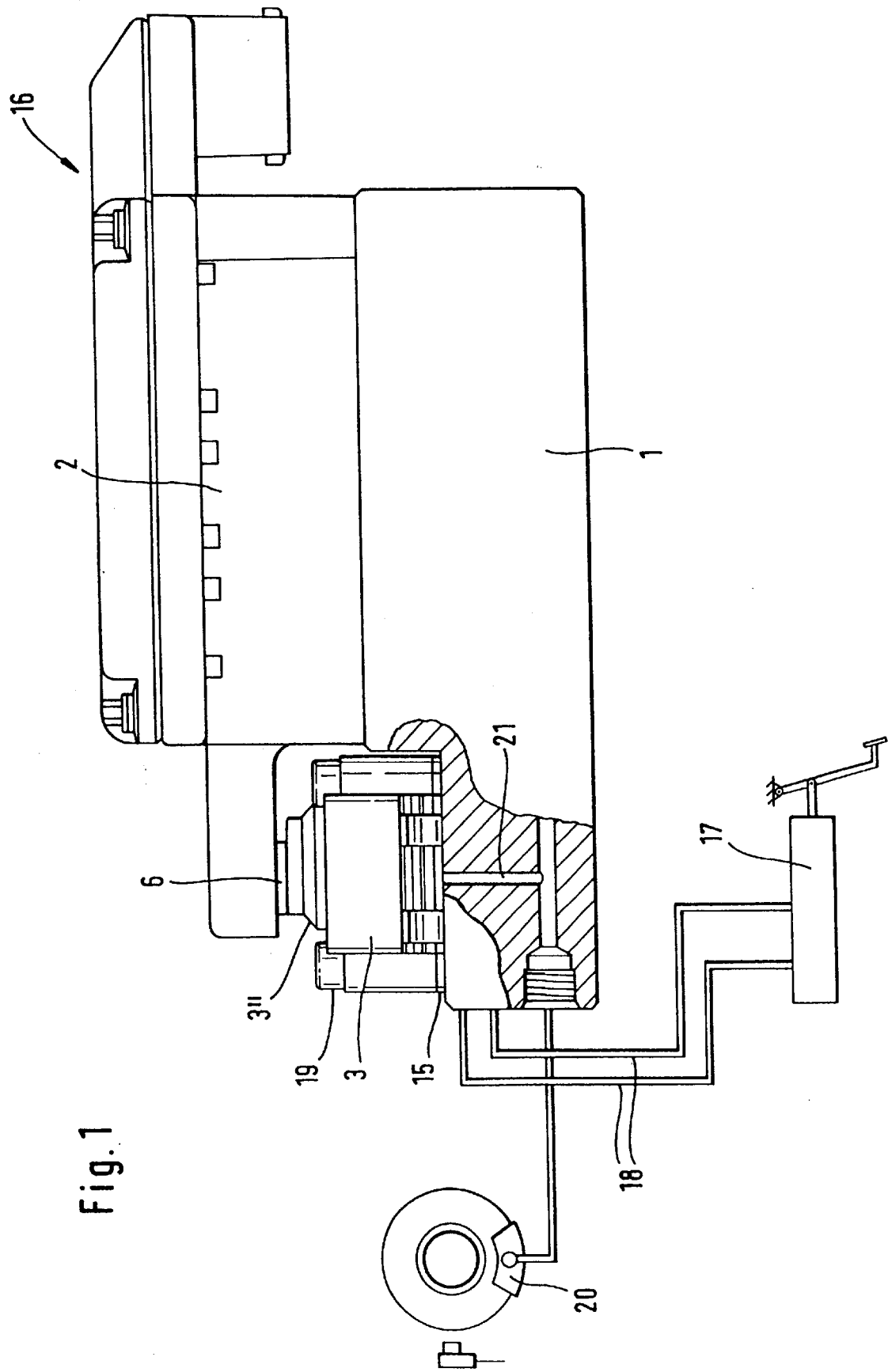
FIG. 1 is an overall view of a pressure control device for operating a wheel-slip controlled brake system of a motor vehicle.

FIG. 1 gives a schematic representation of a pressure control device 16, comprising a first, block-shaped housing 1 for holding several electrically actuatable pressure control valves and a second block-shaped housing 2 that is placed on top of it. Housing 2 contains electric and electronic components that make electric contact to the pressure control valves when the second housing is placed on the first housing 1. In addition, the pressure control device 16 contains several pressure sensors 4 for monitoring the hydraulic pressure in the first housing 1, with such pressure sensors—according to the present invention—being arranged in a carrier housing 3 which, being an operative assembly that can be tested preliminarily, forms an independent subassembly of the pressure control device 16. In the present embodiment screws are provided for attaching the carrier housing 3 to the housing 1, however these can be replaced by other frictional and/or positive holding elements as required or desired.

FIG. 1 also shows that brake lines 18 leading to a brake-pressure transmitter 17 are connected to the first housing 1, with the partial section of housing 1 providing an example as to how the wheel-brake pressure of a wheel brake 20 is sensed by the pressure sensor 4 of each wheel brake 20 respectively via an appropriate pressure channel 21 in the first housing 1. Although only the term pressure sensor will be used below, a pressure switch can be used in its place, if so required or desired.

A housing cover 3, which has one single plug attachment 6, is provided on the housing 3 for electrically connecting the pressure sensors 4 inserted in a row in the block-shaped housing 3 to an electronic controller located in housing 2. Further details regarding the electric connection of the pressure sensors 4 to the plug attachment 6 will be described later on the basis of FIG. 2.

By arranging the pressure control module between housing 1 and housing 2 by means of the carrier housing 3, the production as well as the performance tests of the individual assemblies, including the pressure control device 16, are simplified. The carrier housing, which is operative due to the pre-assembled pressure sensors 4, is attached to the end face of housing 1 facing housing 2 by means of several screws arranged along its circumference, and when the two housings 1, 2 are joined the contact surface formed like a projection on housing 2 needs to be placed on the plug attachment 6 of the pressure sensor unit like a counterplug. In this, basically known and simple, way, the simple plug connection ensures a single analog output and the electric contacting of all pressure sensors 4 to the electronic controller in housing 2. Hence, the proposed arrangement, attachment and contacting of the pressure sensor module between the two housings 1, 2 leads to a compact design.

The exact design of the pressure sensor module will be described in more detail below on the basis of FIG. 2. The pressure sensor module essentially consists of the above-mentioned carrier housing 3, which has first and second diametrical end faces, wherein the first end face exhibits several pressure intake openings 5 arranged in a row and the second end face exhibits one single central electromechanical plug attachment 6. The carrier housing 3 essentially consists of a housing frame 3' for holding electromechanical components and a cover 3" for closing the housing frame 3'. Between the housing frame 3' and the cover 3", there are electric and/or electronic components 7 mounted on a single printed circuit board 8, which is aligned in the housing frame 3' close to the pressure sensors 4 inserted in the stepped bores 9 of the carrier housing 3.

A bearing ring 10, a sealing ring 11, a pressure sensor 4, and a retaining ring 12 are inserted in every stepped bore 9 in the above order in the direction towards the pressure intake opening 5. The retaining ring 12 holds the above-mentioned components in their position in the carrier housing 3 and endure the high hydraulic pressure in housing 3. In order to fasten the retaining ring 12, stepped bore 9 has a relief thread or snap ring groove where the retaining ring 12 locks into position automatically when it is inserted. The bearing ring 10 and sealing ring 11 respectively are placed into the stepped bore 9 before the knob-shaped pressure sensor 4 is inserted. The contact pins 13 of the pressure sensors 4 are oriented towards the printed circuit board 8 and preferably designed as plug contacts or soldering contacts. The printed circuit board 8 is inserted and fixed in position in the housing frame 3' and holds the evaluation electronics, i.e. electronic components 7, required for the pressure sensors 4. The printed circuit board 8 is connected electrically to the contacts of the plug attachment 6 in the cover 3 by means of a flexible conductor foil or conductor track 14. However, it would also be possible to position the printed circuit board 8 in the cover 3' if the pressure sensors are contacted only through plug contacts. The carrier housing 3 is sealed with respect to the housing 1 by means of a sealing plate 15 which exhibits openings aligned concentrically to the pressure intake openings 5, with the sealing plate 15, on the one hand, locking into place in a recess of the carrier housing 3 according to the proposed embodiment and, on the other hand, being aligned through the fastening screws 19 extending through the carrier housing 3 and sealing plate 15.

Consequently, according to the present invention, several pressure sensors 4 arranged in a row are compactly integrated in a joint carrier housing 3 to form a pressure sensor module, which, furthermore, holds the essential electric and electronic components 7 on a printed circuit board 8 in order to attain one single analog interface that leads to a compact plug attachment. Through these measures of integration the costs for producing the pressure sensor module as well as the assembly work are reduced.

Figure 2:
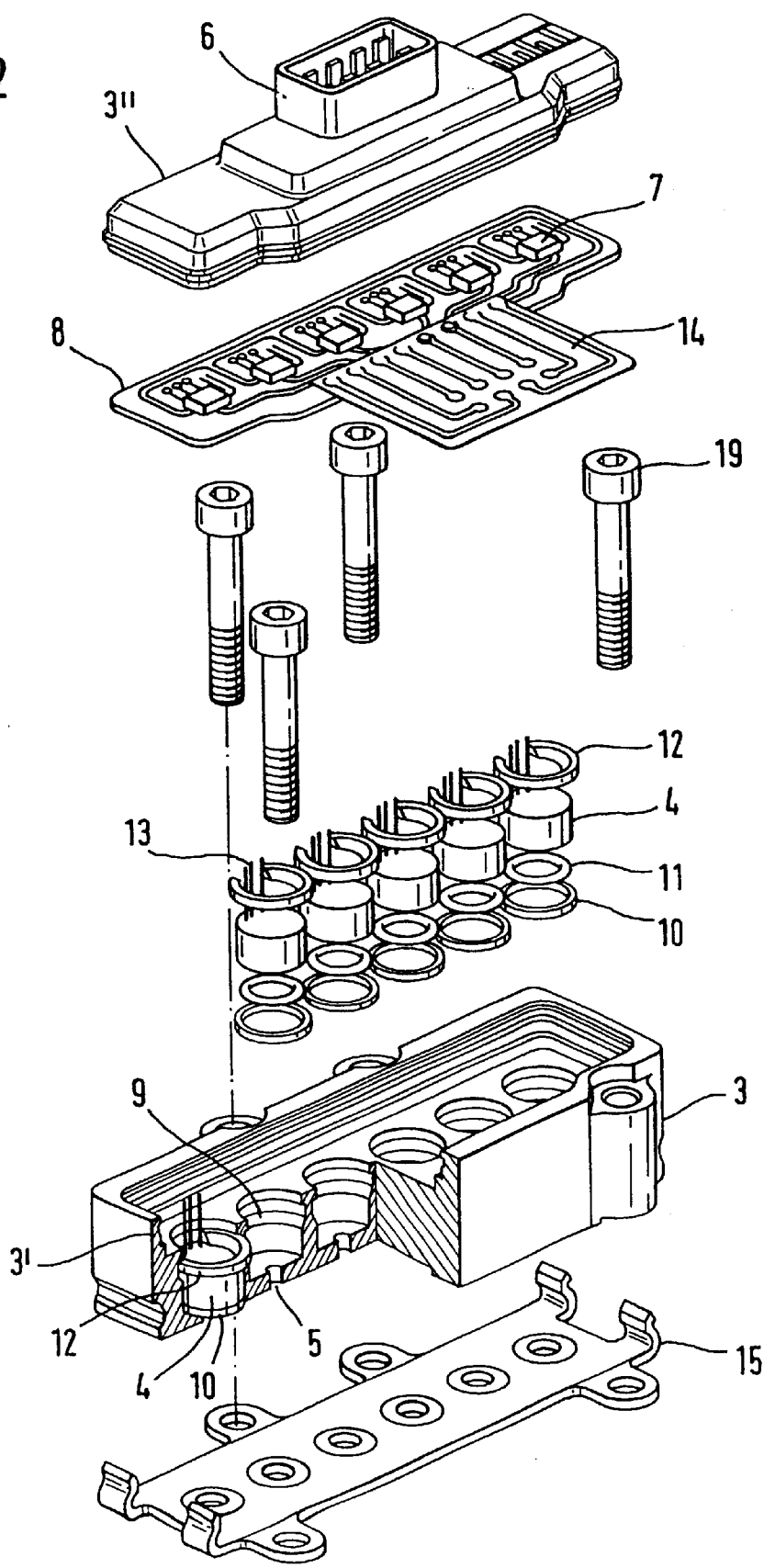
FIG. 2 shows an exploded view of the pressure sensor unit shown in FIG. 1.
Figure 3:
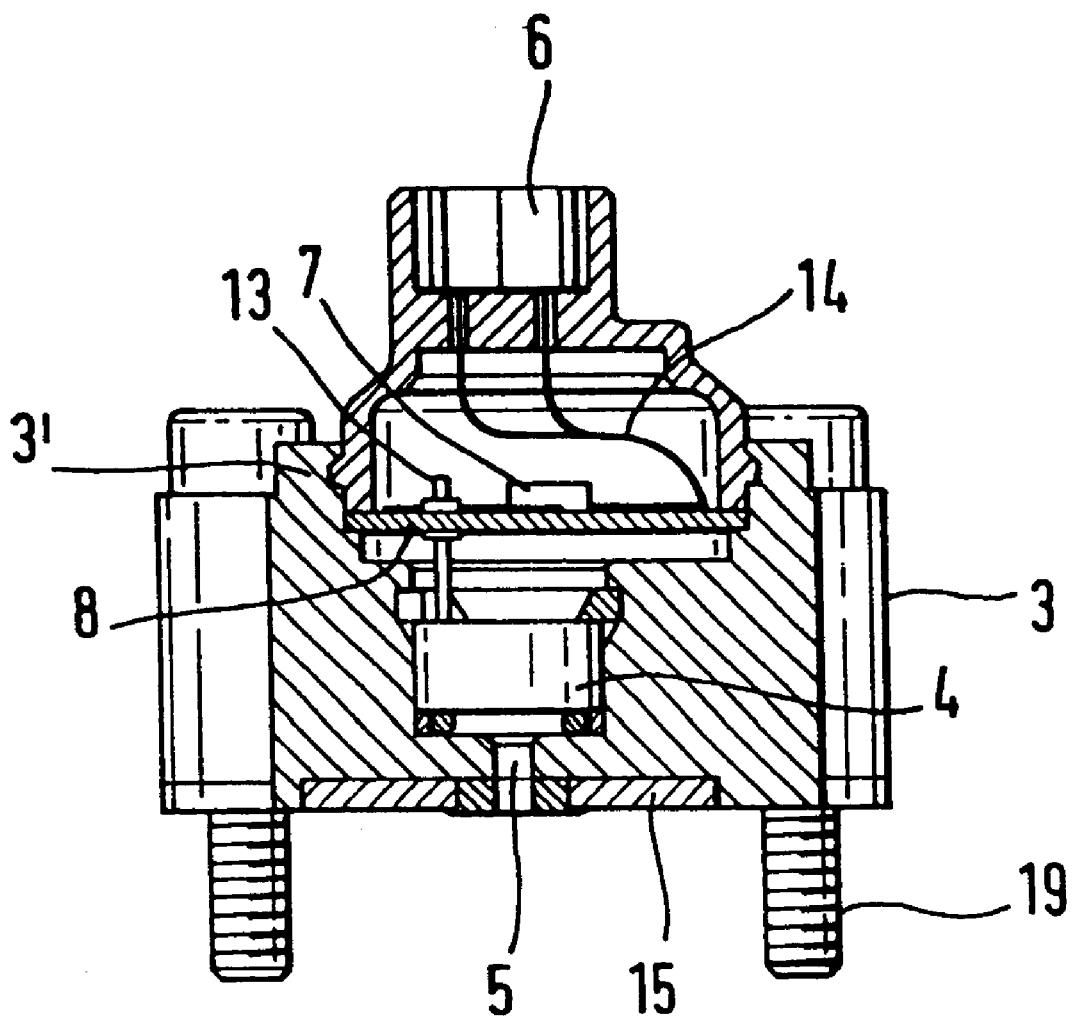
FIG. 3 provides a cross-section of the pressure sensor unit shown in FIG. 2.

In this connection FIG. 3 shows a cross-sectional view of the pressure sensor unit shown in FIG. 2, comprising a block-shaped carrier housing 3 in which several stepped bores 9 for holding the pressure sensors 4 are arranged parallel to one another. The stepped bores 9 extend from the correspondingly arranged pressure intake openings 5 to the openings in the sealing plate 15. The cover 3'' with the plug attachment 6 is located on the end face of the housing 3 facing away from this. It is jammed or clipped onto the housing frame 3'. The printed circuit board 8 is fastened in the housing frame 3' according to the above-mentioned details, and it is connected to the plug attachment 6 via the contact pins 13 of the pressure sensors 4 and flexible conductor tracks 14. The fastening screws 19 are also shown in order to obtain a flange connection to the housing 1.

What is claimed is:

1. A pressure sensor unit for a pressure control device, comprising:
    a first housing for holding several electrically actuatable pressure control valves and a second housing for holding electric or electronic components which make electric contact to the pressure control valves when the second housing is placed on the first housing, wherein the pressure control device includes at least one pair of pressure sensors for sensing the pressure in the first housing and wherein said at least one pair of pressure sensors are arranged between the first and second housing,
    a carrier housing for holding said at least one pair of pressure sensors, wherein the carrier housing accepts the pressure sensors as a nodular assembly to form an independent subassembly that is positioned between the first and second housing of the pressure control device, wherein the carrier housing includes one single plug connection for the electrical contact making of all pressure sensors with the electric or electronic components of an electronic controller in the second housing,
    wherein the carrier housing has a first and second diametrical end face, with the first end face exhibiting hydraulic pressure intake openings and the second end face exhibiting an electromechanical plug attachment.

2. A pressure sensor unit according to claim 1, wherein the carrier housing exhibits a housing frame for holding electromechanical or electronic components of the pressure sensors, wherein a cover is placed on the carrier housing to close the housing frame and establish electric contact between the components in the carrier housing and the electric or electronic components in the second housing.

3. A pressure sensor unit according to claim 2, further including a printed circuit board for holding electric or electronic components is arranged between the housing frame and the cover, with such printed circuit board being oriented on a plane to the pressure sensors inserted in a row in the stepped bores of the carrier housing.

4. A pressure sensor unit according to claim 3, wherein several contact pins of every pressure sensor are oriented towards the printed circuit board, which is placed on the contact pins by means of plug or soldering contacts.

5. A pressure sensor unit according to claim 3, wherein the housing frame fixes in place the printed circuit board for establishing the electric contacting of the pressure sensors.

6. A pressure sensor unit according to claim 1, wherein the electromechanical plug attachment is connected to the printed circuit board by means of flexible conductor tracks.

7. A pressure sensor unit according to claim 6, wherein the carrier housing exhibits a housing frame for holding electromechanical or electronic components of the pressure sensors, wherein a cover is placed on the carrier housing to close the housing frame and establish electric contact between the components in the carrier housing and the electric or electronic components in the second housing, and wherein the conductor track is arranged between the cover and the housing frame.

8. A pressure sensor unit according to claim 1, further including a sealing plate arranged between the first housing and the carrier housing, the openings of which are aligned concentrically to the pressure intake openings and which is fastened to the carrier housing.

9. A pressure sensor unit according to claim 8, wherein a circumference of the sealing plate is adapted to the third housing and is held in place on the circumference surfaces of the carrier housing by means of friction or positive holding elements.

10. A pressure sensor unit for a pressure control device, comprising:
    a first housing for holding several electrically actuatable pressure control valves and
    a second housing for holding electric or electronic components which make electric contact to the pressure control valves when the second housing is placed on the first housing, wherein the pressure control device includes at least one pair of pressure sensors for sensing the pressure in the first housing and wherein said at least one pair of pressure sensors are arranged between the first and second housing,
    a carrier housing for holding said at least one pair of pressure sensors, wherein the carrier housing accepts the pressure sensors as a modular assembly to form an independent subassembly that is positioned between the first and second housing of the pressure control device, wherein the carrier housing includes one single plug connection for the electrical contact making of all pressure sensors with the electric or electronic components of an electronic controller in the second housing, wherein the carrier housing exhibits a housing frame for holding electromechanical or electronic components of the pressure sensors, wherein a cover is placed on the carrier housing to close the housing frame and establish electric contact between the components in the carrier housing and the electric or electronic components in the second housing, further including a printed circuit board for holding electric or electronic components is arranged between the housing frame and the cover, with such printed circuit board being oriented on a plane to the pressure sensors inserted in a row in the stepped bores of the carrier housing, further including a bearing ring, a sealing ring, a pressure sensor and a retaining ring inserted in every stepped bore in the above order in the direction towards a pressure intake opening.

* * * * *

UNITED STATES PATENT AND TRADEMARK OFFICE
CERTIFICATE OF CORRECTION

| | | |
|---|---|---|
| PATENT NO. | : 6,382,738 B1 | Page 1 of 1 |
| DATED | : May 7, 2002 | |
| INVENTOR(S) | : Ronald Bayer, Manfred Rüffer, Ulrich Neumann, Andreas Klein, Johann Jungbecker and Christian Albrich Von Albrichsfeld | |

It is certified that error appears in the above-identified patent and that said Letters Patent is hereby corrected as shown below:

<u>Column 4,</u>
Line 1, change "as a nodular assembly" to -- as a modular assembly --.

Signed and Sealed this

Third Day of December, 2002

JAMES E. ROGAN
*Director of the United States Patent and Trademark Office*